Patented May 3, 1927.

1,627,230

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR PREPARING A REACTION PRODUCT OF ACETALDEHYDE AND ANILINE.

No Drawing.    Application filed May 26, 1923. Serial No. 641,764.

This invention relates to a process for preparing a reaction product of acetaldehyde and aniline.

Its principal object is to provide a simple, efficient process for manufacturing this material, so that an optimum product for the treatment of rubber whether for use as an accelerator as set forth in my Patent No. 1,417,970, patended May 30, 1922, or otherwise is produced.

It has been found in accordance with my invention that the characteristics of the product resulting from the reaction of acetaldehyde and aniline may be controlled particularly by controlling the acidity of the solution in which the reaction occurs, and that within certain limits of acidity a high yield of the desired product is obtained, and that outside of these limits either a greatly lower yield is obtained or a yield of a product with other qualities is secured.

The invention accordingly consists in a process for preparing a reaction product of acetaldehyde and aniline which comprises combining acetaldehyde with aniline in the presence of a solution having hydrogen ion concentration of $1 \times 10^{-3}$ to $2.5 \times 10^{-6}$.

In one manner of carrying out the invention, 1500 parts by weight of an aqueous solution containing 12.1 parts by weight of anhydrous sodium acetate, and 9.2 parts by weight of glacial acetic acid (or equivalent amount of commercial acid) are prepared and by this solution 1760 parts by weight of acetaldehyde are absorbed while the solution is maintained at substantially room temperature, 70° F. approximately. It will be noted that the amount of acetaldehyde given, 1760 parts by weight, is the amount absorbed, not the amount run into the solution. This solution is preferably kept over night in a closed vessel. Thereupon 1500 parts by weight of aniline are added to the vigorously stirred solution in the course of two hours. The temperature of the mixture is preferably not allowed to rise above 40-50° C. Any escaping acetaldehyde is caught and returned by a reflux condenser. After the aniline is all added the mixture is maintained at 40-50° C. with continuous stirring for three hours and then allowed to stand over night. Thereupon the supernatant liquid is siphoned off and the mixture is distilled preferably in vacuo at 140° C. for not more than three hours. Ordinary pressure may be employed if desired.

The water solution of sodium acetate and acetic acid produces a solution having a hydrogen ion concentration of approximately $2.5 \times 10^{-5}$. Substantially equally good results may be obtained where other materials than sodium acetate and acetic acid are employed, and where the hydrogen ion concentration lies between $2.5 \times 10^{-4}$ and $2.5 \times 10^{-6}$. Good results may also be obtained where the range of hydrogen ion concentration is from $1 \times 10^{-3}$ to $1 \times 10^{-9}$. A greater hydrogen ion concentration than $1 \times 10^{-3}$ produces a reaction product which is a weak accelerator. A hydrogen ion concentration less than $1 \times 10^{-9}$ produces a relatively poor yield.

It will be understood of course that acetaldehyde employed above in the preferred example may be employed as a gas as such or may be produced either in the presence of aniline or otherwise as desired.

The reaction between acetaldehyde and aniline is best carried on at temperatures from 35°-92° C. It has been found that prolonged heating has a bad effect upon the condensation product. It requires long heating to remove any large amount of aniline which has not reacted with the acetaldehyde, therefore it is desirable to cause all the aniline to react first by adding an excess of acetaldehyde and second by stirring the reaction mixture under a reflux condenser for some time so as to insure a complete reaction. As indicated in the preferred example an excess of acetaldehyde over that required by the proportion of 2 molecules of acetaldehyde and 1 molecule of aniline is employed. If aniline remains in the reaction product the accelerating property of the product remains about the same as if no aniline were present. However such product has the objection that it possesses the objectionable odor of aniline and also the toxic properties thereof.

The reaction product resulting from the above procedure gives the following results when used in the vulcanization of rubber: When 100 parts rubber, 10 parts zinc oxide, 3 parts sulphur and 0.3 part of the reaction product above prepared are mixed by milling in the usual manner and the resulting mixture vulcanized in a mold with steam at 40 lbs. pressure for 60 minutes a rubber having an average tensile strength of approximately 2800–3000 lbs. per square inch is obtained.

On the other hand the reaction product of acetaldehyde and aniline prepared in the presence of a water solution having a hydrogen ion concentration of greater than $1 \times 10^{-3}$—for example in the presence of hydrochloric acid giving a hydrogen ion concentration of approximately $1 \times 10^{-2}$—produces a reaction product which has practically no accelerating properties. Again a reaction product prepared in the presence of a water solution having a hydrogen ion concentration of less than $1 \times 10^{-9}$, for example in the presence of sodium borate producing a hydrogen ion concentration of $5.7 \times 10^{-10}$ approximately produces a yield about 15% as great as would be obtained under the optimum conditions given above.

Having thus described my invention, what I claim and desire to protect by Letters Patent is:

1. A process for preparing the reaction product of acetaldehyde which comprises combining acetaldehyde with aniline in the presence of a water solution to which is imparted a hydrogen ion concentration of $1 \times 10^{-3}$ to $2.5 \times 10^{-6}$.

2. A process for preparing the reaction product of acetaldehyde which comprises combining acetaldehyde in an amount slightly in excess of 2 molecules with aniline in an amount of approximately 1 molecule in the presence of a water solution to which is imparted a hydrogen ion concentration of $1 \times 10^{-3}$ to $2.5 \times 10^{-6}$.

3. A process for preparing the reaction product of acetaldehyde which comprises combining acetaldehyde with aniline in the presence of a water solution to which is imparted a hydrogen ion concentration of $1 \times 10^{-3}$ to $2.5 \times 10^{-6}$ at a temperature of 35°–92° C.

4. A process for preparing the reaction product of acetaldehyde which comprises combining acetaldehyde in an amount slightly in excess of 2 molecules with aniline in an amount of approximately 1 molecule in the presence of a water solution to which is imparted a hydrogen ion concentration of $2.5 \times 10^{-4}$ to $2.5 \times 10^{-6}$, maintaining the temperature at 40°–50° C.

5. A process for preparing the reaction product of acetaldehyde which comprises preparing 1500 parts by weight of an aqueous solution containing 12.1 parts of anhydrous sodium acetate and 9.2 parts of glacial acetic acid, absorbing thereby 1760 parts by weight of acetaldehyde, adding 1500 parts of aniline to the solution, maintaining the temperature at 40°–50° C., and distilling the resulting product at 140° C. approximately to rid the product of aniline.

Signed at New York, county and State of New York, this 23rd day of May, 1923.

SIDNEY M. CADWELL.